US006207209B1

(12) United States Patent
Jirjis et al.

(10) Patent No.: US 6,207,209 B1
(45) Date of Patent: Mar. 27, 2001

(54) METHOD FOR REMOVING PHOSPHOLIPIDS FROM VEGETABLE OIL MISCELLA, METHOD FOR CONDITIONING A POLYMERIC MICROFILTRATION MEMBRANE, AND MEMBRANE

(75) Inventors: Bassam Jirjis; Harapanahalli S. Muralidhara, both of Plymouth; Dennis D. Otten, Elk River, all of MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 09/231,692

(22) Filed: Jan. 14, 1999

(51) Int. Cl.$^7$ .............................. A23D 9/02; B01D 61/14
(52) U.S. Cl. ...................... 426/330.6; 426/417; 426/422; 426/478; 426/490; 554/175; 554/177; 554/206; 134/40; 210/348; 210/650; 210/651
(58) Field of Search ................................... 426/417, 478, 426/330.6, 422, 492, 490; 210/650, 651, 348; 554/175, 177, 206; 134/40

(56) References Cited

U.S. PATENT DOCUMENTS

| 4,062,882 | 12/1977 | Sen Gupta . | |
| 4,093,540 | 6/1978 | Sen Gupta . | |
| 4,414,157 | 11/1983 | Iwama et al. . | |
| 4,496,489 | 1/1985 | Sen Gupta . | |
| 4,533,501 | 8/1985 | Sen Gupta . | |
| 4,787,981 | 11/1988 | Tanahashi et al. . | |
| 4,797,200 | * 1/1989 | Osterhuber | 210/651 |
| 5,166,376 | 11/1992 | Suzuki et al. . | |
| 5,207,917 | * 5/1993 | Weaver | 210/650 |
| 5,310,487 | 5/1994 | LaMonica . | |
| 5,374,356 | * 12/1994 | Miller | 210/651 |
| 5,707,673 | 1/1998 | Prevost et al. . | |

FOREIGN PATENT DOCUMENTS

| 1149290 | * 7/1983 | (CA) | 210/651 |
| 182396 | 5/1986 | (EP) . | |
| 2084606 | 4/1982 | (GB) . | |
| 2118568 | * 4/1982 | (GB) | 210/650 |
| 2092170 | * 8/1982 | (GB) | 210/651 |
| 58-194996 | 11/1983 | (JP) . | |
| 59-020394 | 2/1984 | (JP) . | |
| 60-184596 | 9/1985 | (JP) . | |
| 60-184597 | 9/1985 | (JP) . | |
| 62-045592 | 2/1987 | (JP) . | |
| 2155989 | 6/1990 | (JP) . | |
| 4183795 | 6/1992 | (JP) . | |
| WO 83/03620 | * 10/1983 | (WO) . | |

OTHER PUBLICATIONS

Subramanian, R. et al., "Evaluation of Surfactant–Aided Degumming of Vegetable Oils by Membrane Technology", *Journal of the American Oil Chemists' Society*, vol. 76, No. 10, pp. 1247–1253 (1999).

"Dietary Guidelines Changes Recommended", *INFORM*, vol. 6, No. 11, pp. 1213, 1243 (Nov. 1995).

Cheryan et al., "Refining Vegetable Oils by Membrane Technology", *Developments in Food Engineering, Proceedings of the 6th International Congress on Engineering and Food*, pp. 677–679.

Cuperus et al., "Applications of Membrane Technology to Food Processing", *Trends in Food Science & Technology*, vol. 4, pp. 277–282 (Sep. 1993).

Dutta et al., "Formation and Analysis of Oxidized Sterols in Frying Fat", Chapter 6, pp. 112–150.

Iwama et al., "New Polyimide Ultrafiltration Membranes for Organic Use", *Journal of Membrane Science*, vol. 11, pp. 297–309 (1982).

Iwama et al., Membrane Separation Process for Soybean Oil Refining and Its Economical Effects, *Membrane*, vol. 11, No. 2, pp. 99–108 (1986).

Kochhar, S., "Influence of Processing on Sterols for Edible Vegetable Oils", *Prog.Lipid Res.*, vol. 22, pp. 161–188 (1983).

Koseoglu et al., "Membrane Applications and Research in the Edible Oil Industry: An Assessment", *JAOCS*, 67(4):239–249 (Apr. 1990).

Koseoglu, S., "Membrane Technology for Edible Oil Refining", *Oils & Fats International*, Issue 5, pp. 16–21 (1991).

Krawczyk, T., "Lecithin: Consider the Possibilities", *INFORM*, vol. 7, pp. 1159–1175 (Nov. 1996).

Kutowy et al., "Use of Membranes for Oil Upgrading", *Proc. 35th Can. Chem. Eng. Conf.*, vol. 1, pp. 26–30 (1985).

Lin, L. et al., "Bench–scale Membrane Degumming of Crude Vegetable Oil: Process Optimization," *Journal of Membrane Science*, vol. 134, pp. 101–108 (1997).

Ondrey et al., "The Skinny on Oils & Fats", *Chemical Engineering*, pp. 34–38 (Oct. 1997).

Pioch et al., "Towards an Efficient Membrane Based Vegetable Oils Refining", *Industrial Crops and Products Journal*, vol. 7, pp. 83–89 (1998).

Raman et al., "Deacidification of Soybean Oil by Membrane Technology", *JAOCS*, vol. 73, No. 2, pp. 219–224 (1996).

Raman et al., "Membrane Technology", *Oils & Fats International*, vol. 10, No. 6, pp. 28–40 (1994).

(List continued on next page.)

*Primary Examiner*—Carolyn Paden
(74) *Attorney, Agent, or Firm*—Merchant & Gould P.C.

(57) ABSTRACT

A method for removing phospholipids from vegetable oil miscella is provided. The method includes steps of feeding vegetable oil miscella to a conditioned polymeric microfiltration membrane, and recovering a permeate stream having a decreased weight percent of phospholipids compared with the weight percent of phospholipids provided in the miscella. The polymeric microfiltration membrane can be conditioned for the selective separation of phospholipids in the miscella. A method for conditioning a membrane for selective separation of phospholipids from vegetable oil miscella, and the resulting membrane, are provided. The membrane which can be conditioned can be characterized as having an average pore size of between about 0.1$\mu$ and about 2$\mu$.

17 Claims, 1 Drawing Sheet

OTHER PUBLICATIONS

Schulte, E., "Determination of Edible Fat Refining by HPLC of Δ 3,5–Steradienes", *Fat Sci. Technol.*, vol. 96, No. 4, pp. 124–128 (1994).

Sen Gupta, "Novel Developments in Refining of Edible Oils", *Fette, Seifen, Anstrichmittel*, vol. 88, No. 3, pp. 79–86 (1986).

Shchipunov et al., "Growth, Branching, and Local Ordering of Lecithin Polymer–Like Micelles", *Langmuir*, vol. 14, No. 22, pp. 6350–6360 (1998).

Shelton, H., "Estimating the Lower Explosive Limits of Waste Vapors", *Environmental Engineering World*, pp. 22–25 (May–Jun. 1995).

Snape et al., "Processing of Agricultural Fats and Oils Using Membrane Technology", *Journal of Food Engineering*, vol. 30, pp. 1–41 (1996).

Subramanian, R. et al., *JOACS*, vol. 74, No. 8, pp. 971–975 (1997).

Ziegelitz, R., "Lecithin Processing Possibilities", *INFORM*, vol. 6, No. 11, pp. 1224–1230 (Nov. 1995).

Koseoglu et al., "Membrane Processing of Crude Vegetable Oils: Laboratory–Scale Membrane Degumming, Refining and Bleaching", pp. 182–188.

* cited by examiner

METHOD FOR REMOVING PHOSPHOLIPIDS FROM VEGETABLE OIL MISCELLA, METHOD FOR CONDITIONING A POLYMERIC MICROFILTRATION MEMBRANE, AND MEMBRANE

FIELD OF THE INVENTION

The invention relates to a method for removing phospholipids from vegetable oil miscella, a method for conditioning a polymeric microfiltration membrane for selective removal of phospholipids from miscella, and membrane.

BACKGROUND OF THE INVENTION

Edible vegetable oils are generally obtained by processing oil seeds. Crude vegetable oils can be obtained from vegetable seeds by solvent extraction. Hexane is the most commonly used extraction solvent. The crude vegetable oils generally contain neutral triglycerides and a host of natural contaminants including phosphotides, sulphurous compounds, free fatty acids, carbohydrates, peptides, oxidized lipids, traces of lower aldehydes and ketones, glycosides of sterols and terpenes, and diverse types of color bodies or dyestuffs. These contaminants are removed from the crude vegetable oils in the course of refining in order to render the vegetable oils palatable.

The recovery of soybean oil from soybeans is particularly desirable. A technique for recovering soybean oil includes several processing steps. The soybean is dehulled and crude soybean oil is extracted with hexane. The extractant (miscella), which includes hexane and crude soybean oil, is further processing to recover palatable soybean oil. The hexane is evaporated from the miscella and the resulting crude soybean oil is degummed. Degumming, as used in conventional processes, refers to the removal of phosphatides and other gums from the oil by adding water and/or acid thereto and centrifuging. The recovered oil can be further refined with water and alkaline (such as NaOH) and centrifuged to remove the fatty acids and gums. The oil resulting from the alkaline refining step can then be bleached to remove color bodies, hydrogenated to render the oils more stable, and deodorized. The techniques of degumming, alkaline refining, bleaching, hydrogenating, and deodorizing are well known in the art. It should be appreciated that each separation step, and particularly centrifuging, results in loss of oil.

Numerous prior art references describe techniques for obtaining vegetable oils by application of membrane technology. For example, U.S. Pat. No. 4,093,540 to Sen Gupta describes refining crude glyceride oils by contacting a composition of glyceride oils and organic solvent under pressure with a semi-permeable ultrafiltration membrane to separate constituents of different molecular weight into retentate and permeate fractions, and contacting the composition or at least one of the fractions with a metal oxide or metalloid oxide adsorbent in a column containing the adsorbent. Additional references which describe the use of membrane technology for separating phospholipids from crude vegetable oils include: U.S. Pat. No. 4,414,157 to Iwama et al.; U.S. Pat. No. 4,533,501 to Sen Gupta; Raman et al., "Membrane Technology", Oils & Fats International, Vol. 10, No. 6, 1994, pages. 28–40; Ziegelitz, "Lecithin Processing Possibilities", Inform, Vol. 6, No. 11, Nov. 1995, pages. 1224–1213; Ondrey et al., "The Skinny On Oils & Fats", Chemical Engineering, Oct. 1997, pages. 34–39; Pioch et al., "Towards An Efficient Membrane Based Vegetable Oils Refining", Industrial Crops & Products, 7 (1998) pages 83–89; Koseoglu et al., "Membrane Applications & Research In The Edible Oil Industry: And Assessment, JAOCS, Vol. 67, No. 4 (April 1990), pages 239–249.

SUMMARY OF THE INVENTION

A method for removing phospholipids from vegetable oil miscella is provided by the present invention. The method includes a step of feeding vegetable oil miscella to a membrane for recovery of a permeate stream and a retentate stream, and recovering the permeate stream having decreased weight percent of phospholipids compared with the weight percent of phospholipids provided in the miscella.

In the context of the present invention, the permeate stream is the stream which flows through the membrane, and the retentate stream is the stream which does not flow through the membrane. The vegetable oil miscella includes extraction solvent and crude vegetable oils containing phospholipids. The membrane includes a polymeric microfiltration membrane conditioned for selective separation of phospholipids from the miscella to provide a permeate stream having a decreased weight percent of phospholipids compared with the weight percent of phospholipids provided in the miscella. The microfiltration membrane, prior to modification, is preferably provided having an average pore size in the range of about $0.1\mu$ to about $2\mu$.

The vegetable oil miscella preferably contains between about 45 percent by weight and about 90 percent by weight extraction solvent, and more preferably between about 70 percent by weight and about 80 percent by weight extraction solvent. A preferred extraction solvent includes hexane. The permeate stream preferably includes less than 0.6 weight percent phospholipids, more preferably less than about 0.15 weight percent phospholipids, and even more preferably less than about 0.015 weight percent phospholipids.

A method for conditioning a microfiltration membrane is provided by the invention. The method includes providing a polymeric microfiltration membrane characterized as having an average pore size in the range of about $0.1\mu$ to about $2\mu$. Preferably, the polymeric microfiltration membrane comprises polyacrylonitrile, polysulfone, polyamide, or polyimide. The polymeric microfiltration membrane can be conditioned by treating the membrane with an intermediate solvent, and then treating the membrane with an extraction solvent. A preferred embodiment of the invention includes treating the membrane with a mixture of intermediate solvent and extraction solvent between the steps of treating the membrane with an intermediate solvent and treating the membrane with an extraction solvent.

The steps of treating the membrane with solvent are conducted for a period of time which is sufficient to provide the desired level of conditioning. In most cases, it is expected that the treatment will include flushing and/or soaking for at least about one half hour. For convenience, it may be desirable to allow the membrane to soak in the particular solvent over night or for a period of up to about 24 hours. It should be understood that longer soaking times are permitted.

The treatment with the intermediate solvent is advantageous to reduce the likelihood of shocking or harming the membrane when treated with the extraction solvent. Exemplary intermediate solvents include alcohols and acetone. Preferably, the intermediate solvent is one which is miscible with the extraction solvent. In the case of using hexane as the extraction solvent, the intermediate solvent is preferably ethanol, propanol or a mixture of ethanol and propanol.

A conditioned polymeric microfiltration membrane is provided by the invention. The conditioned membrane can be characterized as a membrane resulting from the steps of conditioning. In addition, the conditioned membrane can be characterized in terms of its performance. For example, a soybean oil miscella can be providing containing 25 percent by weight crude soybean oil and 75 percent by weight hexane, and containing a phosphorous level of about 5,000 ppm in the crude oil. By feeding the miscella to the membrane at a transmembrane pressure of about 150 psi, it is expected that the membrane will provide a steady state permeate at a flux of greater than about 65 l/hr m$^2$ and a phosphorous level of less than about 50 ppm. Preferably, the phosphorous level will be less than about 25 ppm. More preferably, the flux will be greater than about 80 l/hr m$^2$.

DETAILED DESCRIPTION OF THE INVENTION

Figure 2:
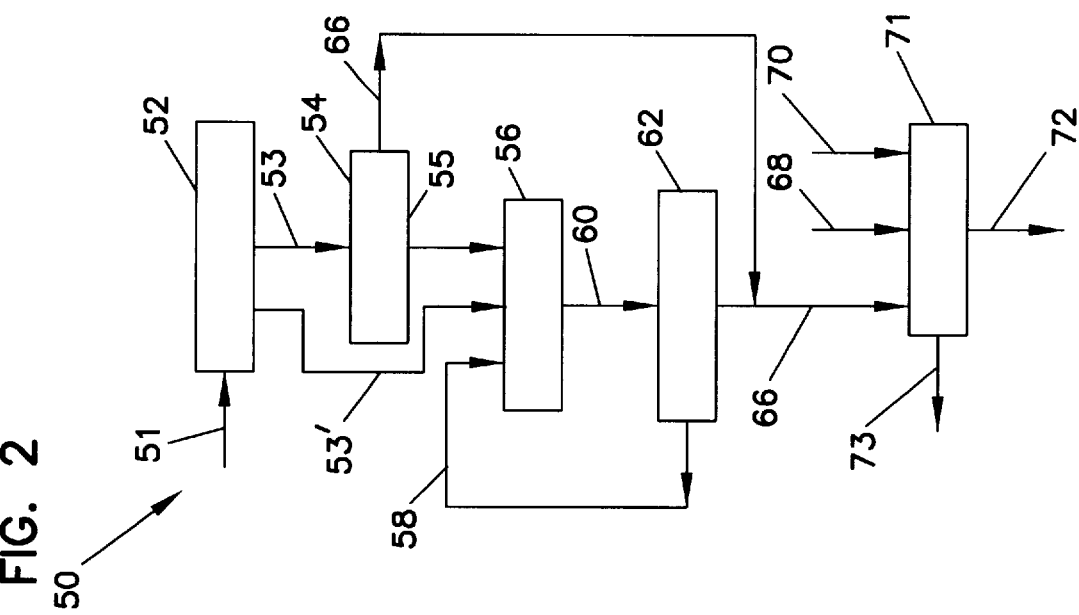
FIG. 2 is a diagrammatic representation of a prior art method for removing phospholipids from vegetable oil miscella utilizing acid and alkaline treatment.

The invention relates to a method for degumming vegetable oil miscella. Vegetable oil miscella can be referred to herein more simply as miscella. Miscella refers to the extractant resulting from solvent extraction of vegetable seeds. The miscella generally includes extraction solvent, crude vegetable oils obtained by extraction from the vegetable seeds, and meal fines resulting from the ground vegetable seeds. Techniques for solvent extraction of vegetable seeds are well known and are described, for example, in *Bailey's Industrial Oil and Fat Products*, 5$^{th}$ Edition, edited by Y. H. Hui, New York, Wiley, 1996, and *Handbook of Soy Oil Processing and Utilization*, St. Louis, Mo., American Soybean Association, Champaign, Ill, American Oil Chemists' Society, the disclosures of which are incorporated herein by reference.

The preferred vegetable oils which can be isolated according to the present invention are the edible vegetable oils which are well-known in the vegetable oil industry. Exemplary vegetable oils include coconut oil, palm oil, palm kernel oil, soya bean oil, corn oil, ground nut oil, olive oil, linseed oil, rapeseed oil, sunflower seed oil, safflower seed oil, cottonseed oil, and grape seed oil. Preferred oils which can be recovered according to the invention include soya bean oil, rapeseed oil, ground nut oil, corn oil, sunflower oil, cottonseed oil, and linseed oil.

In order to recover edible vegetable oils from the miscella, the phospholipids are removed. The technique for removing phospholipids from miscella can be referred to as miscella degumming. While a feature of the invention relates to removal of phospholipids from miscella, it should be appreciated that other impurities in the miscella can additionally be removed by the invention. In particular, significant amounts of color bodies and free fatty acids provided in the miscella can be removed by the technique of removing phospholipids from vegetable oil miscella according to the invention.

The solvent which can be used for extracting crude vegetable oils from crushed vegetable seeds is one in which the vegetable oils readily solubilize. Such solvents are well—known in the industry. The solvent is preferably one having a comparatively low molecular weight. That is, a molecular weight which is not substantially more than that of the vegetable oil. Preferably, the molecular weight of the solvent is between about 50 and about 200, and more preferably between about 60 and about 150. Solvents of low molecular weight, e.g., esters and halohydrocarbons, can be used but preferred solvents include inert hydrocarbons, particularly alkanes, cycloalkenes, and simple aromatic hydrocarbons, e.g., benzene and its homologues containing alkyl substituents having up to four carbon atoms. These solvents tend to improve the mobility of the oil and bringing about a transformation of any phospholipid molecules present to form micelles. This phenomena, which can be described as aggregation of a large number of phospholipid molecules under the influence of the solvent to bodies (micelles) of high molecular weight which can be as high as 200,000 in hexane, greatly increases the effective particle size of the phospholipids, enabling them to be wholly retained by membranes permitting the free passage of the oil and solvent present. Moreover, the micelles thus formed appear to imbed the comparatively small molecules of other impurities such as sugars and amino acids which might otherwise escape with the oil through the membrane. Exemplary hydrocarbons include benzene, toluene, xylenes, cycloalkanes such as, cyclohexane, cyclopentane, and cyclopropane, and alkanes, such as pentanes, hexanes, butanes and octanes in mixtures thereof, petroleum ether boiling between the range of –1° C. and 120° C. or alkenes.

While it is preferred to use hydrocarbons which are normally liquid at ambient temperatures, other solvents may be used which are liquid only under the filtration pressure used. Where the oil is to be separated by evaporating off the solvent, the solvent is preferably of comparatively low boiling point. Where phosphotides are not present in significant amounts, other organic solvents including acetone may be used.

The amount of solvent is the miscella is generally provided as a result of extracting crude vegetable oils from vegetable seeds. Accordingly, the amount of solvent present in the miscella may vary depending upon the particular solvent extraction design utilized. While an amount of solvent can be removed from the miscella prior to degumming the miscella, it is preferred that a sufficient amount of solvent remain which allows the miscella to flow through a separation membrane. In general, it is expected that the miscella will include an amount of solvent of between about 45 percent by weight and about 90 percent by weight, and more preferably between about 70 percent by weight and about 80 percent by weight.

Removing Phospholipids

Figure 1:
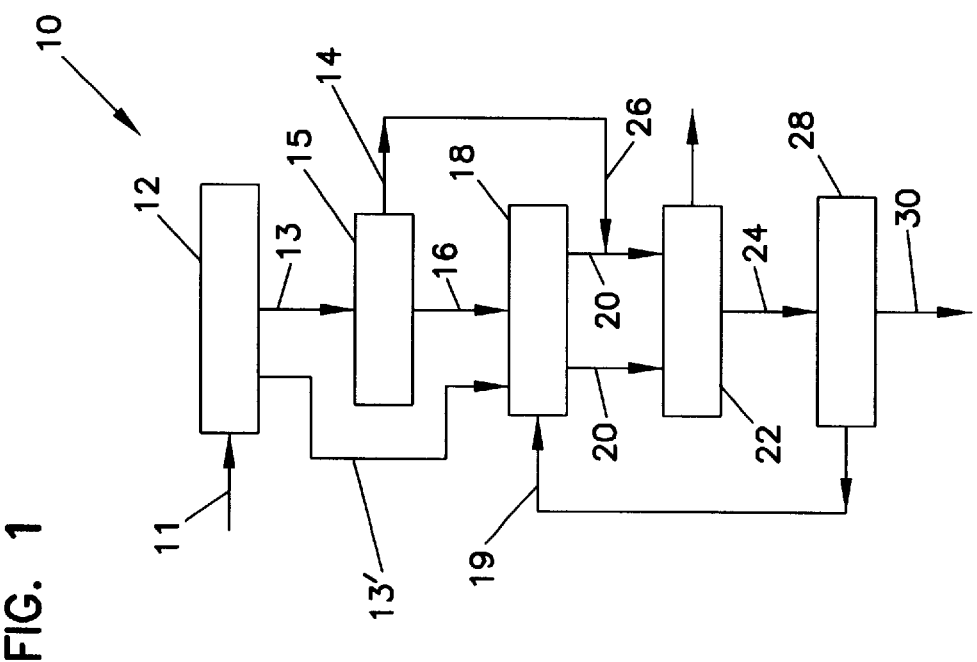
FIG. 1 is a diagrammatic representation of a method for removing phospholipids from vegetable oil miscella according to the principles of the present invention.

Now referring to FIG. 1, a method for removing phospholipids from vegetable oil miscella according to the invention is provided at reference numeral 10. Oil seeds are prepared for extraction using techniques well known in the art. Oil seeds 11 are processed in a preparation unit 12. This generally includes dehulling and/or grinding. Crude vegetable oil 14 can be obtained from certain types of vegetable oils by expelling in an expeller unit 15. Accordingly, the ground oil seeds 13 can be fed to an expeller 15 to provide crude vegetable oil 14. It should be understood that crude vegetable oil is generally not obtained from all types of oil seeds by expelling. Accordingly, the ground oil seeds 13' can be sent directly to an extractor 18, bypassing the expeller 15. In addition, expelled cake 16 can be processed for the recovery of crude vegetable oil by extraction A solvent 19 is introduced into the extractor 18 and miscella 20 is recovered. The miscella 20 includes, as major constituents, extraction solvent, vegetable oils, and phospholipids. Techniques for forming miscella by solvent extraction of vegetable oil seeds are generally known in the art. If desired, the expelled crude oil 14 can be combined with the miscella 20 for further processing.

The phospholipids can be removed from the miscella 20 by feeding the miscella 20 to a filter 22 which includes a separation membrane. The separation membrane is preferably a polymeric microfiltration membrane which has been conditioned to selectively remove phospholipids from the miscella 20. Details of the separation membrane and techniques for providing the conditioning for selective removal of phospholipids are described below.

The separation membrane can be provided in any form which can provide the desired degree of miscella degumming. In general, membranes are available as spiral wound membranes, tubular membranes, and flat plate membranes. For the removal of phospholipids from miscella, spiral wound membranes are preferred because they are generally more cost effective than other filter designs.

A permeate stream 24 flows from the filter 22 and includes vegetable oils and extraction solvent having a decreased concentration of phospholipids. The retentate stream 26 flows from the filter 22 and includes vegetable oils and extraction solvent and an increased concentration of phospholipids. The filtration system can be a batch or continuous. A preferred type of continuous filtration system includes a feed and bleed system.

The permeate stream 24 is fed to an evaporator 28 for removal of the extraction solvent. The resulting vegetable oil stream 30 can be treated by steps of refining, bleaching, hydrogenating, and deodorizing which are generally known in the art. Such techniques are described, for example, in the *Handbook of Soy Oil Processing and Utilization*, St. Louis, Mo., American Soybean Association, Champaign, Ill, American Oil Chemists' Society.

The method of the invention can be used to provide a resulting vegetable oil stream 30 containing a desired level of phospholipids. Typically, commercially degummed vegetable oil has a phosphorous level of less than 100 ppm. In general, lower levels of phosphorous in vegetable oil are desirable. The method of the invention can provide a vegetable oil stream 30 having a phosphorous level of less than 30 ppm, and more preferably less than 5 ppm.

Now referring to FIG. 2, a prior art method for removing phospholipids form vegetable oil miscella is shown at reference numeral 50. This prior art process is shown to provide a comparison with the process of the invention. In general, oil seeds 51 are processed in a preparation unit 52, and, if desired, the ground seeds 53 are subject to expelling in an expeller 54. The ground seeds 53' and/or the expelled cake 55 is fed to an extractor 56, along with an extraction solvent 58, and miscella 60 is recovered. The solvent 58 is recovered from the miscella in an evaporator 62. The resulting crude oil 66 (which can also be obtained from the expeller 54 for certain types of oil seeds) is subjected to water 68 and acid 70 treatment in order to hydrate the phospholipids. The water and acid treated crude oil is processed in a centrifuge 71 to remove the hydrated gums 73. The resulting degummed stream 72 is generally treated with aqueous alkaline for neutralization and further centrifuging. The resulting oil is then typically bleached, hydrogenated, and deodorized.

Membrane Conditioning

The invention relates to the conditioning of a polymeric microfiltration membrane for the selective removal of phospholipids from vegetable oil miscella. The conditioned polymeric microfiltration membrane can be referred to herein as the conditioned membrane.

Membranes generally act as filters for preventing the flow therethrough of particular sized components. The membranes can be characterized in terms of their average pore size. For example, membranes having an average pore size of between about $0.1\mu$ and about $2\mu$ are referred to as microfilters or microfiltration membranes; membranes having an average pore size of between about 10,000 mwco (molecular weight cut-off using Dextran) and about $0.1\mu$ are referred to as ultrafilters or ultrafiltration membranes; membranes having an average pore size of between about 200 mwco and about 10,000 mwco are referred to as nanofilters; and membranes that can remove components of below 200 mwco are referred to as reverse osmosis membranes.

Applicants discovered that by conditioning a microfiltration membrane, the membrane can be provided for selectively removing phospholipids from miscella. Furthermore, the flux across the membrane is increased at a given transmembrane pressure compared with the use of an ultrafiltration membrane for removal of phospholipids from miscella. Alternatively, the use of a conditioned microfiltration membrane can provide a lower transmembrane pressure at a given flux across the membrane compared with the use of an ultrafiltration membrane.

The microfiltration membrane is preferably conditioned by successive solvent treatments. In general, commercially available polymeric microfiltration membranes are delivered from the manufacturer soaking in water or glycerol. The successive treatment of the membrane is provided for conditioning the membrane so it will function in the miscella. That is, the membrane should be conditioned so that it will not react adversely when contacted with the extraction solvent provided in the miscella. In cases where the membrane would be shocked by placement directly in the extraction solvent for conditioning, an intermediate solvent can be used to provide a first level of conditioning before the membrane is introduced into the extraction solvent.

The treatment of the microfiltration membrane is provided for gradually changing the polarity of the membrane. Accordingly, the treatment can involve flushing with a solvent, soaking in a solvent, or a combination thereof. Furthermore, the treatment can include successive treatment with different solvents or blends of solvents to provide the modified membrane.

In a preferred method for conditioning a polymeric microfiltration membrane, the membrane is preferably first soaked in an intermediate solvent, such as an alcohol. Preferred alcohols which can be used as the intermediate solvent include ethanol, propanol, isopropanol, butanol, octanol, and mixtures thereof. Preferred alcohols are those which are miscible with the extraction solvent. In the case where hexane is the extraction solvent, a preferred intermediate solvent includes ethanol, propanol, and a mixture of ethanol and propanol. A non-alcohol intermediate solvent includes acetone.

Prior to the soaking, the membrane can be flushed with intermediate solvent to remove water or glycerol or other solvent in which the membrane is provided. The membrane is then preferably soaked in a mixture of intermediate solvent and extraction solvent. When hexane is the extraction solvent, the mixture preferably includes about 50 percent by weight ethanol and 50 percent by weight hexane. The membrane is then flushed with the extraction solvent to remove the intermediate solvent. The membrane can then be used according to the invention. It should be appreciate that while a preferred embodiment of the invention is described in the context providing at least three separate treatment steps, the invention can be practiced by treating the membrane in an intermediate solvent and then treating the membrane in the extraction solvent. Furthermore, it should be understood that the extraction solvent refers to the solvent provided in the miscella. Thus, the extraction solvent in the miscella can contribute to the treatment of the membrane.

It should be appreciated that the length of treatment of the membrane in a particular solvent should be sufficient to provide the desired level of conditioning in that step. For example, it is expected that the step of treating the membrane in an intermediate solvent can be provided in 10 minutes. It is convenient, however, to allow the membrane to soak for at least one-half hour, and more preferably about 5 hours to about 24 hours. It is expected that the step of treating the membrane in a mixture of intermediate solvent and extraction solvent can be provided in 10 minutes, but is conveniently provided for up to about 5 hours or 24 hours. Furthermore, it is expected that the step of treating the membrane in the extraction solvent is can be provided to remove intermediate solvent. It is expected that flushing the membrane with extraction solvent to remove intermediate solvent will take place in about 10 minutes. However, it is convenient to allow the membrane to soak in extraction solvent for about 5 hour or up to about 24 hours.

After the membrane has been used according to the invention, it can be cleaned and regenerated by treating with extraction solvent. In general, it is expected that the membrane can be used for removing phospholipids from miscella in a continuous filtration operation for at least about 24 hours before cleaning the membrane in the extraction solvent for a period of time generally less than one-half hour. The membrane can be cleaned by flushing with extraction solvent for an amount of time sufficient to remove phospholipids from the membrane. It is expected that the membrane can be cleaned by flushing in extraction solvent for about 10 minutes. Furthermore, the cleaning time in the extraction solvent can be provided for greater than one-half hours. In addition, it should be appreciated that rather than using pure extraction solvent to flush the membrane for cleaning, it is expected that fresh miscella which has not been concentrated can be used for cleaning the membrane. In general, miscella obtained directly from an extractor can be referred to as unconcentrated miscella. Furthermore, it is expected that an acid can be added to the extraction solvent or unconcentrated miscella in order to assist the cleaning. For example, citric acid, phosphoric acid, lactic acid, or sulfuric acid can be added to extraction solvent in an amount of about 0.1 or about 0.2 percent by weight to provide assistance in cleaning.

Membranes which can be used according to the invention include a $0.3\mu$ polyacrylonitrile (PAN) membrane available from Osmonics, Inc. of Minnetonka, Minnesota, and a $0.1\mu$ polysulfone (PS) membrane which is available from Hoechst Separation Product of Wiesbaden, Germany. Other polymeric microfiltration membranes such as polyamide (PA) and polyimide (PI) can also be used according to the invention.

A preferred extraction solvent which can be used for conditioning the membrane includes hexane. It should be appreciated that the reference to hexane includes the isomers of hexane such as isohexane and n-hexane. In addition, the extraction solvent can include isopropanol.

The conditioned membrane of the invention can be characterized in terms of its performance. For example, a soybean oil miscella feed characterized by 25 percent by weight crude soybean oil and 75 percent by weight hexane, and having a phosphorus level of about 5,000 ppm (based on the crude oil) and provided at a transmembrane pressure of 150 psi, can be filtered through the membrane to provide a permeate at a flux of greater than 65 l/hr m$^2$ and a phosphorous level of less than about 50 ppm. Preferably, the flux will be greater than 80 l/hr m$^2$. More preferably, the level of phosphorous in the permeate will be less than about 25 ppm. For a corn oil miscella containing 25 percent by weight crude corn oil and 75 percent by weight hexane, and a phosphorous level of about 13,200 ppm at 150 psi, a filtrate will be provided at a flux of greater than about 65 l/hr m$^2$ having a phosphorous level of less than about 50 ppm. Preferably, the flux will be greater than about 75 l/hr m$^2$. Furthermore, the level of phosphorous in the permeate is preferably less than about 25 ppm. It should be appreciated that the above-identified flux values are provided under steady state conditions.

The performance of the conditioned membrane of the invention is supported by the following example. It should be understood that the example is not intended to limit the scope of the invention.

EXAMPLE

Three samples of miscella were prepared by using the present techniques. Miscella samples were obtained from three different oil seeds plants.

A membrane was conditioned and used for removing phospholipids from each of the three samples of miscella. The membrane purchased was a PAN membrane from Osmonics, Inc. The membrane can be characterized as having an average pore size of $0.3\mu$, and in the form of a spiral wound 25×40 membrane element. The membrane was conditioned by soaking the membrane in an intermediate solvent (propanol) for 24 hours. Then the membrane was soaked in mixture of intermediate solvent (propanol) and extraction solvent (hexane) for 24 hours. Finally, the membrane was soaked in extraction solvent (hexane) for 24 hours.

The three samples of miscella were individually processed. For the soy bean oil miscella and the canola oil miscella, test was conducted at retentate concentration of 10×of the feed concentration. The permeate rate at 10×concentration was 100 l/hr m$^2$ and 66 l/hr m$^2$ for soy bean miscella and canola oil miscella, respectively. For the corn oil, the test was conducted at retentate concentration of 7.4×of the feed at permeate rate of 80 l/hr m$^2$. The feed and permeate were analyzed, and the results are reported in table 1.

TABLE 1

Analysis of Miscella Membrane Degummed Oil

| | Soybean oil Extracted | | Corn oil Extracted | | Canola oil Extracted + Prep | |
|---|---|---|---|---|---|---|
| | Feed | Permeate | Feed | Permeate | Feed | Permeate |
| phosphorous ppm | 545 | 21 | 1783 | 41.2 | 505 | 24.4 |
| Ca, ppm | 34.2 | 1.7 | 14.4 | 0.83 | 137.5 | 8.05 |
| Mg, ppm | 26 | 1.68 | 264.4 | 5.54 | 82.4 | 4.36 |
| FFA, wt % | 0.35 | 0.14 | 2.88 | 1.78 | 0.58 | 0.46 |
| Chlorophyll, | 391 ppb | 126 ppb | NA | NA | 16.1 ppm | 10.1 ppm |

TABLE 1-continued

Analysis of Miscella Membrane Degummed Oil

| | Soybean oil Extracted | | Corn oil Extracted | | Canola oil Extracted + Prep | |
|---|---|---|---|---|---|---|
| | Feed | Permeate | Feed | Permeate | Feed | Permeate |
| Red | 13 | 9.3 | 70* | 30 | — | 4.0* |
| Yellow | 40 | 30 | 21.5 | 15.6 | — | 70* |
| % Solvent in Miscella | 75 | 75 | 75 | 75 | 60 | 60 |
| Filtration Rate L/hr. m² | | 100[1] | | 80[2] | | 66[1] |

*lovibond color using a 1 inch cell
[1]Filtration rate at 10X concentration of the feed
[2]Filtration rate at 7.4X concentration of the feed The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for removing phospholipids from vegetable oil miscella, the method comprising steps of:
    (a) feeding vegetable oil miscella to a membrane for recovery of a permeate stream and a retentate stream, wherein said miscella comprises extraction solvent and crude vegetable oil containing phospholipids, and said membrane comprises a polymeric microfiltration membrane conditioned for selective separation of phospholipids from said miscella to provide a permeate stream having decreased weight percent of phospholipids compared with the weight percent of phospholipids provided in said miscella; the polymeric microfiltration membrane being conditioned by a three step conditioning sequence comprising:
        (i) treating the microfilter with intermediate solvent, the intermediate solvent comprising an alcohol, acetone, or a combination thereof; and
        (ii) treating the microfilter with a mixture of the intermediate solvent and extraction solvent, the extraction solvent comprising hydrocarbon, ester, halohydrocarbon, or a combination thereof; and
        (iii) treating the microfilter with the extraction solvent;
    (b) recovering said permeate stream having decreased weight percent of phospholipids compared with the weight percent of phospholipids provided in said miscella.

2. A method for removing phospholipids from vegetable oil miscella according to claim 1, wherein the microfiltration membrane comprises a membrane provided on a backing, the membrane characterized as having an average pore size in the range of about $0.1\mu$ to about $2\mu$.

3. A method for removing phospholipids from vegetable oil miscella according to claim 1, wherein said miscella comprises between about 45 and about 90 weight percent extraction solvent.

4. A method for removing phospholipids from vegetable oil miscella according to claim 1, wherein the extraction solvent comprises hexane.

5. A method for removing phospholipids from vegetable oil miscella according to claim 1, wherein said permeate stream comprises less than about 0.6 weight percent phospholipids.

6. A method for removing phospholipids from vegetable oil miscella according to claim 1, wherein said permeate stream comprises less than about 0.15 weight percent phospholipids.

7. A method for removing phospholipids from vegetable oil miscella according to claim 1, wherein said permeate stream comprises less than 0.015 weight percent phospholipids.

8. A method for removing phospholipids from vegetable oil miscella according to claim 1, wherein the microfiltration membrane comprises polyacrylonitrile, polysulfone, polyamide, or polyimide.

9. The method of claim 1, wherein the hydrocarbon comprises alkane, cycloalkane, alkene, cycloalkene, aromatic hydrocarbon, or a combination thereof.

10. The method of claim 9, wherein the aromatic hydrocarbon comprises benzene, benzene homologue containing alkyl substituents having up to four carbon atoms, or a combination thereof.

11. The method of claim 10, wherein the benzene homologue comprises toluene, xylene, or a combination thereof.

12. The method of claim 9, wherein the cycloalkane comprises cyclohexane, cyclopentane, cyclopropane, or a combination thereof.

13. The method of claim 9, wherein the alkane comprises pentanes, hexanes, butanes, octanes, petroleum ether boiling between the range of −1° C. and 120° C., or a combination thereof.

14. The method of claim 1, wherein the extraction solvent comprises one or more hexanes.

15. The method of claim 1, wherein the alcohol comprises alcohol miscible with the extraction solvent.

16. The method of claim 1, wherein the alcohol comprises ethanol, propanol, isopropanol, butanol, octanol, or a mixture thereof.

17. The method of claim 1, wherein the alcohol comprises ethanol, propanol, or a mixture thereof.

* * * * *